(12) United States Patent
Lee et al.

(10) Patent No.: US 8,354,807 B2
(45) Date of Patent: Jan. 15, 2013

(54) ANTI-NOISE METHOD FOR SENSORLESS-BRUSHLESS DIRECT CURRENT MOTOR SYSTEM

(75) Inventors: Teng-Hui Lee, Sanchong (TW); Chan-Chih Liu, Sanchong (TW)

(73) Assignee: Amtek Semiconductor Co., Ltd., Taipei County (TW)

( * ) Notice: Subject to any disclaimer, the term of this patent is extended or adjusted under 35 U.S.C. 154(b) by 297 days.

(21) Appl. No.: 12/967,174

(22) Filed: Dec. 14, 2010

(65) Prior Publication Data
US 2012/0038297 A1    Feb. 16, 2012

(30) Foreign Application Priority Data

Aug. 12, 2010  (TW) .............................. 99127005 A (51) Int. Cl.
*H02P 6/04* (2006.01)
(52) U.S. Cl. .............. 318/400.11; 318/400.34; 318/806; 318/400.3; 318/400.13; 318/400.04; 363/55; 417/12; 417/14; 417/410; 417/410.5; 417/278
(58) Field of Classification Search .................. 318/747, 318/806, 816, 400.3, 400.34, 400.04, 400.06, 318/400.13, 34, 400.11, 779, 400.01, 432, 318/778; 417/12, 14, 410.5, 278; 363/55; 375/297
See application file for complete search history.

(56) References Cited

U.S. PATENT DOCUMENTS

| | | | | |
|---|---|---|---|---|
| 4,922,169 A * | 5/1990 | Freeman | ..................... | 318/400.1 |
| 5,430,362 A * | 7/1995 | Carr et al. | ..................... | 318/779 |
| 5,717,305 A * | 2/1998 | Seibel et al. | .................. | 318/778 |
| 8,148,928 B2 * | 4/2012 | Laulanet et al. | ......... | 318/400.11 |
| 2003/0223510 A1* | 12/2003 | Kurakami et al. | ............ | 375/297 |
| 2008/0067961 A1* | 3/2008 | Chang et al. | .................. | 318/432 |

* cited by examiner

*Primary Examiner* — Lincoln Donovan
*Assistant Examiner* — Jorge Carrasquillo
(74) *Attorney, Agent, or Firm* — Ming Chow; Sinorica, LLC (57) ABSTRACT

An anti-noise method for the Direct Current Brushless motor System, which includes a startup circuit, phase detective circuit, motor phase commutation circuit, driving circuit, BEMF detective circuit, and frequency detector, utilizes the BEMF detective circuit to detect the BEMF induced from the coils of the outer motor, and utilizes the sampled voltage phase to determine rotation speed and phase of the external motor by the phase detection circuit and frequency detector. Further, the sampling voltage of the BEMF detection circuit is feedback controlled by the frequency detector, utilized to keep good BEMF to noise ratio, and avoids the BEMF sampling error from the system.

19 Claims, 9 Drawing Sheets

ANTI-NOISE METHOD FOR SENSORLESS-BRUSHLESS DIRECT CURRENT MOTOR SYSTEM

BACKGROUND OF THE INVENTION

1. Field of the Invention

The present invention is related to an anti-noise method for the direct current brushless motor without using sensor device, and more particularly, related to a anti-noise method utilizing a Back Electromotive Force (BEMF) detection circuit to detect a BEMF induced from the coils of the outer motor and a gain control signal feedback from the phase detection circuit and frequency detector to determine rotation speed and phase of the external motor so as to guarantee that BEMF signal from the direct current brushless motor is able to determine rotation speed and the phase of the external motor.

2. Description of the Prior Art

The technique related to the DC brushless motor in prior art discloses a anti-noise method utilizing a startup circuit to output different startup frequencies and output different driving currents from the control circuit to pass through the driving coil of the external motor and feedback the external BEMF to detect by the detective circuit so as to determine the startup and the operation of the motor in order to guarantee the motor is working properly.

Figure 1A:
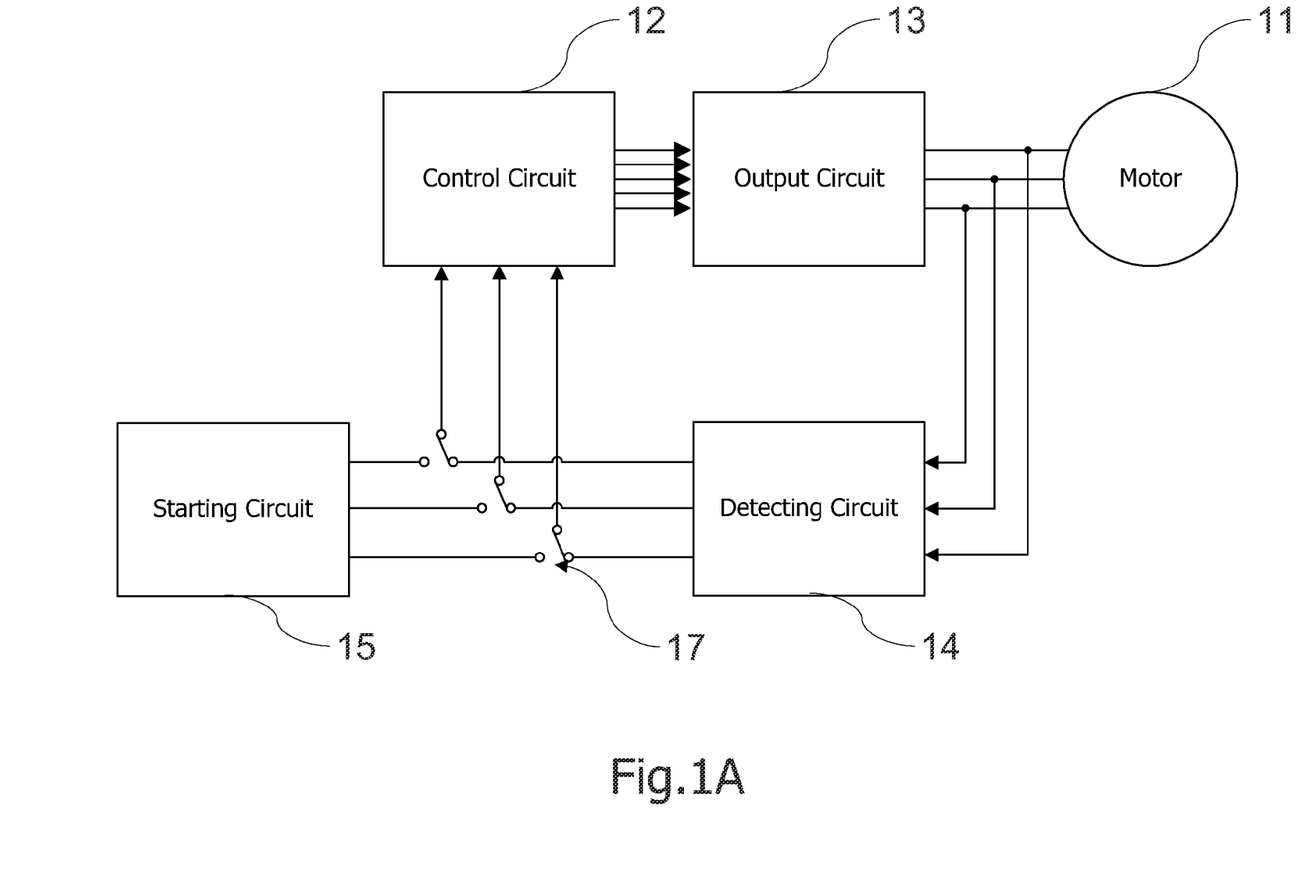
FIG. 1A is a block diagram illustrating a direct current brushless motor system without sensor device in prior art.
Figure 1B:
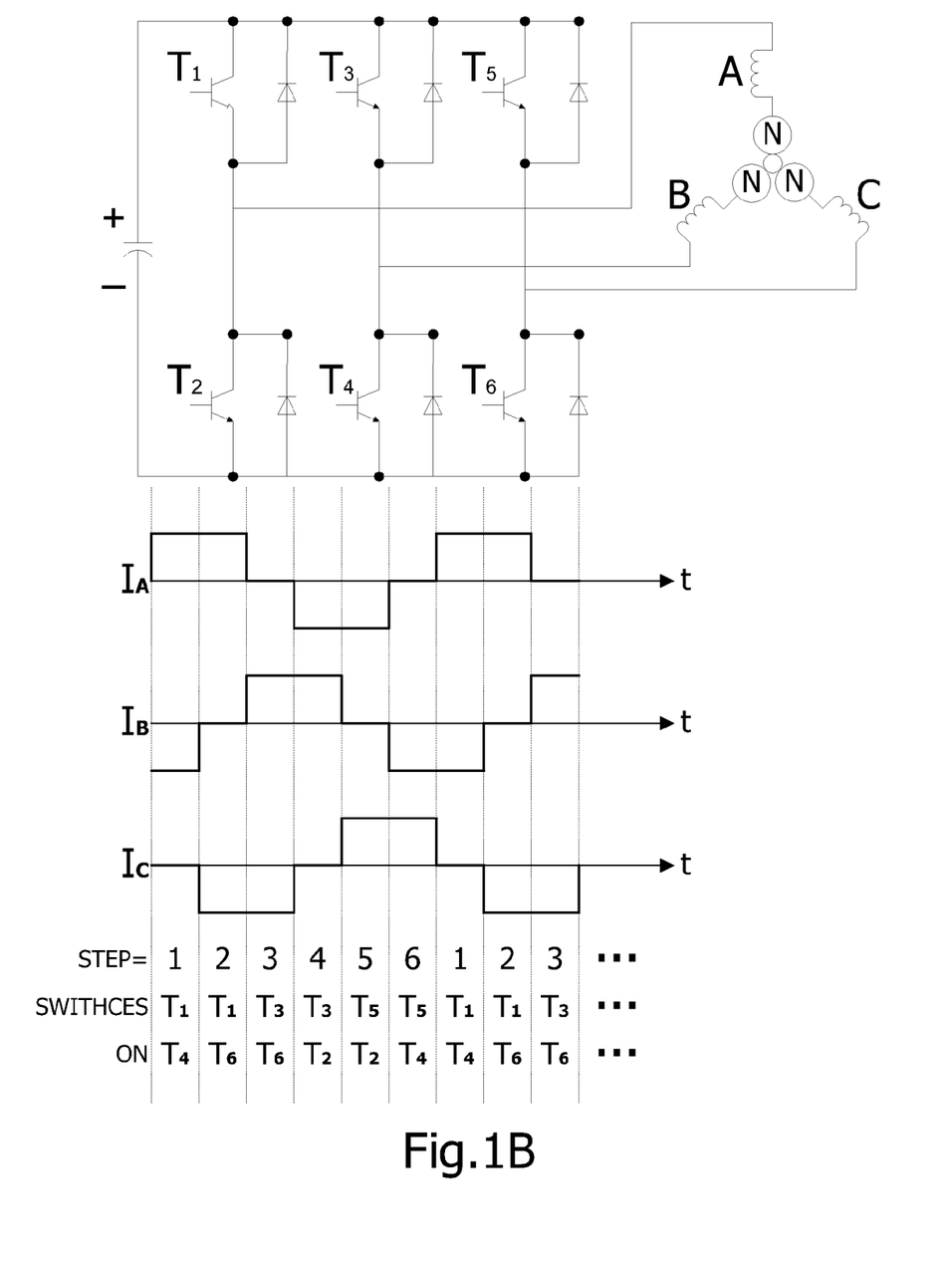
FIG. 1B is a view illustrating a six steps motor driving method circuit in prior art.

As shown in FIG. 1A, it is a block diagram illustrating that a DC brushless motor system without sensor device. As shown in FIG. 1A, the system includes an external motor 11, a control circuit 12, a output circuit 13, a detective circuit 14, a startup circuit 15, and a switching circuit 17. The startup circuit 15 outputs different driving frequencies square waves to the output circuit 13 and the corresponding output current is outputted to the driving coil of the external motor 11. The driving coil of the external motor 11 will generate the Back Electromotive Force (BEMF) to feedback to the detective circuit 14 and the detective circuit 14 will determine the rotation speed and the phase of the external motor 11 in accordance with the BEMF so as to control the startup and the rotation speed of the motor. When the startup circuit 15 is activated to output the activated frequency signal to the control circuit 12, and the signal is transformed to be a six steps driving control signal shown in FIG. 1B, into the output circuit 13. The current of the driving coil of the external motor 11 is accordance with the phase difference of the six steps driving control signal, and the rotation speed and the phase of the external motor 11 is determined by the current of the driving coil.

Figure 2:
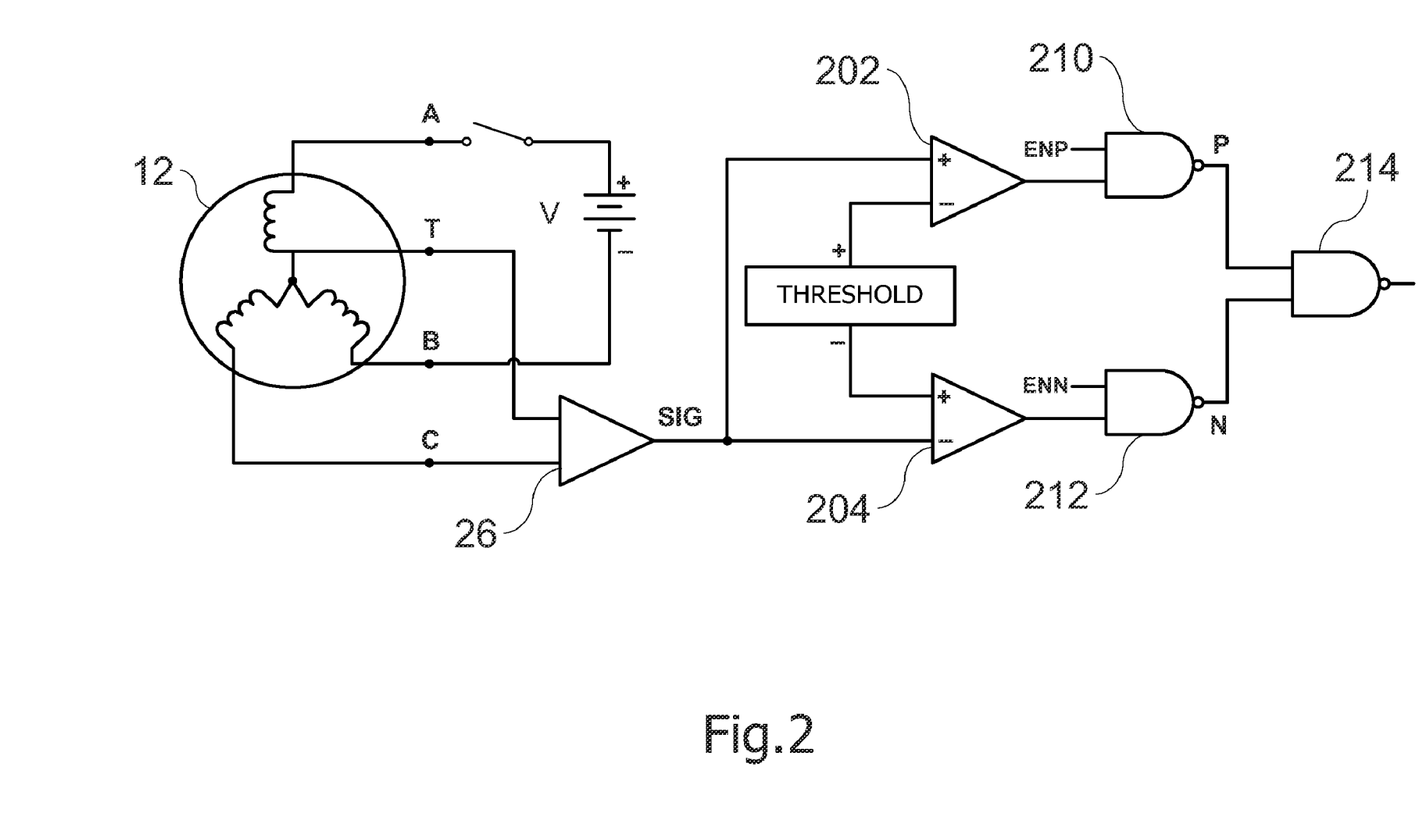
FIG. 2 is a view illustrating a Back Electromotive Force (BEMF) structure in prior art.

FIG. 2 is a view illustrating a conventional BEMF detector without sensor device. The detector includes a three-phase induction motor 11, a BEMF sampler 26, a normal phase comparator 202, a reverse phase comparator 204, a voltage reference (Vth), a normal phase switch 210, a reverse phase switch 212 and a output switch 214. When the motor system is activated, the six steps driving control signal is inputted into the output circuit 13 and three-phase current is outputted from the output circuit 13 to the three-phase motor coil 11 so as to generate the BEMF by the current of the three-phase motor coil 11.

The BEMF is inputted in the positive end of the normal phase comparator 202 and the negative end of the reverse phase comparator 204. The voltage reference (Vth) 206 is connected to the negative end of the normal phase comparator 202 and the positive end of the reverse phase comparator 202. When the phase of the BEMF outputted from the BEMF sampler is between 0~180 degree, the phase value is more than the positive voltage reference, the voltage outputted from the normal phase comparator 202 is high voltage reference. At final, the output of the normal phase comparator 202 and the output of the reverse phase comparator 204 will pass through the normal phase switch 210 and the reverse phase switch 212, and then merge together to be a square wave signal in the output switch 214. Therefore, the square wave outputted from the output switch 214 will inputs to the detective circuit 14 so as to detect the rotation speed and the phase of the external motor 11.

According the description above, The BEMF generated at the three-phase motor coil is detected by the BEMF sampler 26. The high voltage reference is sampled by the normal phase comparator 202 and the reverse phase comparator 204 and inputted into the detective circuit 14 for determining the rotation speed and the phase of the external motor 11. However, the motor driving circuit system in initial rotation and high speed rotation will generate different noise. If the sample voltage of the BEMF is sampled in accordance with the same voltage in different rotation, the system would make a mistake to make a wrong decision so as to cause the malfunction of the system.

According to the motor driving circuit system described above, a different motor driving circuit is provided in the present invention for utilizing at different rotation mode to provide different sample voltage of the BEMF. Therefore, the noise ratio of the BEMF is better and the rotation speed and the phase of the external motor are detected properly so as to achieve a better stability of the system.

SUMMARY OF THE INVENTION

The present invention is to provide a direction current brushless motor system without sensor device having Back Electromotive Force (BEMF) detective circuit. The main object is to determine the rotation speed of the DC brushless motor system is sequentially achieved at the first startup frequency and the second startup frequency to activate the motor driving system. When the motor system has been activated, the BEMF generated by the motor driving system is configured to accurately detect the rotation speed of the motor.

Another object of the present invention is to utilize different BEMF sampling voltage by the BEMF detective circuit to sample the BEMF of the external motor when the DC brushless motor is in different modes. The DC brushless motor is able to accurately detect the rotation speed and the phase of the external motor in accordance with the BEMF signal.

One another object of the present invention is to provide a DC brushless motor system. The sampling signal generated by the frequency detector to control the internal sampling voltage of the BEMF detective circuit to sample the BEMF of the external motor so as to generate a high level detective signal. The high level detective signal is inputted to the phase detective circuit to determine the rotation speed and the phase of the external motor. The frequency detector is feedback to determine the new BEMF detective voltage. The system is working in different modes to acquire the same anti-noise ration so as to guarantee that the DC brushless motor system detects the rotation speed and the phase of the external motor and the system stability in accordance with the BEMF signal.

Moreover, one more object of the present invention is to provide a DC brushless motor system to choice different gain control mode in accordance with the different rotation speeds by the control of the BEMF detective circuit so as to achieve a better anti-noise ration guarantee that the DC brushless motor system detects the rotation speed and the phase of the external motor and the system stability in accordance with the BEMF signal.

According to the objects described above, the present invention provides a direct current (DC) brushless motor system without sensor device having two steps startup function including a control device and one end of the control device is connected to an oscillation device, a switching device and one end of the switching device is connected to the control device and the other end is connected to a startup device, a detective device and one end of the detective device is connected to the startup device, a driving circuit and one end of the driving circuit is connected to the detective device and the other end is connected to an external motor and feedbacks to the other end of the detective circuit; when the DC brushless motor system has been activated, the rotation speed of the DC brushless motor system is sequentially achieved in a first predetermined startup rotation speed and a second predetermined startup rotation speed with different frequency so as to achieve a system predetermined rotation.

The present invention also provides a direct current (DC) brushless motor system without sensor device includes a control device, a switch device, a startup device, a detective device, a driving circuit, and a phase lock loop frequency device. One end of the control device is connected to an oscillation device. One end of the switching device is connected to the other end of the control device. One end of the startup device is connected to the other end of the switching device. One end of the detective device is connected to the other end of the startup device. One end of the driving circuit is connected to the other end of the detective device and the other end is connected to an external motor, and feedbacks to the other end of the detective circuit from a three-phase coil of the external motor. The phase lock loop frequency device is connected to the detective device, wherein the detective device includes a phase detective circuit, and one end of the phase detective device is connected to the startup device and the other end is connected to the frequency detector and the phase lock loop frequency device; a phase rotation circuit, and one end of the phase rotation circuit is connected to the other end of the phase detective circuit and the other end is connected to one end of the driving circuit; a BEMF detector, and one end of the BEMF detector is connected to the feedback of the three-phase coil of the external motor and the other end is connected to the phase detective circuit; a frequency detector, and one end of the frequency detector is connected to the phase detective circuit and the phase lock loop frequency device and the other end is connected to the BEMF detector; wherein the BEMF detector includes: a BEMF detective switch, and one of the BEMF detective switch is connected to the feedback of the three-phase coil of the external motor; a BEMF sample amplifier, wherein a first input end is connected to an output end of the BEMF switch, a second input end is connected to a level voltage of the three-phase coil, and a third input end is connected to the frequency detector and outputs a positive voltage sine wave and a negative voltage sine wave; a hysteresis comparator including a first hysteresis level, and an input end is connected to the positive voltage sine wave and the negative voltage sine wave and the other end is connected to the frequency detector and outputs a BEMF detective signal to the phase detective circuit.

The present invention also provides a rotation speed and phase detective method for a direct current (DC) brushless motor system without sensor device, and the DC brushless motor system includes a control device and one end of the control device is connected to an oscillation device, a switching device and one end of the switching device is connected to the control device and the other end is connected to a startup device, a detective device and one end of the detective device is connected to the startup device, a driving circuit and one end of the driving circuit is connected to the detective device and the other end is connected to an external motor and feedbacks to the other end of the detective circuit from a three-phase coil of the external motor; a phase lock loop frequency device connected to the detective device and wherein the detective device includes a phase detective circuit, and one end of the phase detective device is connected to the startup device and the other end is connected to the frequency detector and the phase lock loop frequency device; a phase rotation circuit, and one end of the phase rotation circuit is connected to the other end of the phase detective circuit and the other end is connected to one end of the driving circuit; a BEMF detector, and one end of the BEMF detector is connected to the feedback of the three-phase coil of the external motor and the other end is connected to the phase detective circuit; a frequency detector, and one end of the frequency detector is connected to the phase detective circuit and the phase lock loop frequency device and the other end is connected to the BEMF detector; wherein the BEMF detector includes: a BEMF detective switch, and one of the BEMF detective switch is connected to the feedback of the three-phase coil of the external motor; a BEMF sample amplifier, wherein a first input end is connected to an output end of the BEMF switch, a second input end is connected to a level voltage of the three-phase coil, and a third input end is connected to the frequency detector and outputs a positive voltage sine wave and a negative voltage sine wave; a hysteresis comparator including a first hysteresis level, and an input end is connected to the positive voltage sine wave and the negative voltage sine wave and the other end is connected to the frequency detector and outputs a BEMF detective signal to the phase detective circuit, wherein when the DC brushless motor system has been activated, the rotation speed and the phase detective method including the following steps: the step of providing a BEMF generated by three-phase current sequence on the three-phase coil passing the BEMF detective switch; the step of providing a level voltage provided by the three-phase coil; the step of provide a pair of sine wave voltages generated in accordance with comparing the BEMF and the level voltage by the BEMF amplifier, and the pair of sine wave voltages includes a positive voltage sine wave and a negative voltage sine wave; the step of providing a BEMF detective signal generated in accordance with the sine wave voltages by the hysteresis comparator, and the BEMF detective signal is connected to the phase detective circuit to detect the present rotation speed and the phase of the external motor; and the step of providing a gain control signal, and the gain control signal is outputted in accordance with the preset rotation speed of the phase lock loop frequency device and the present rotation speed of the external motor by the frequency detector.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3:
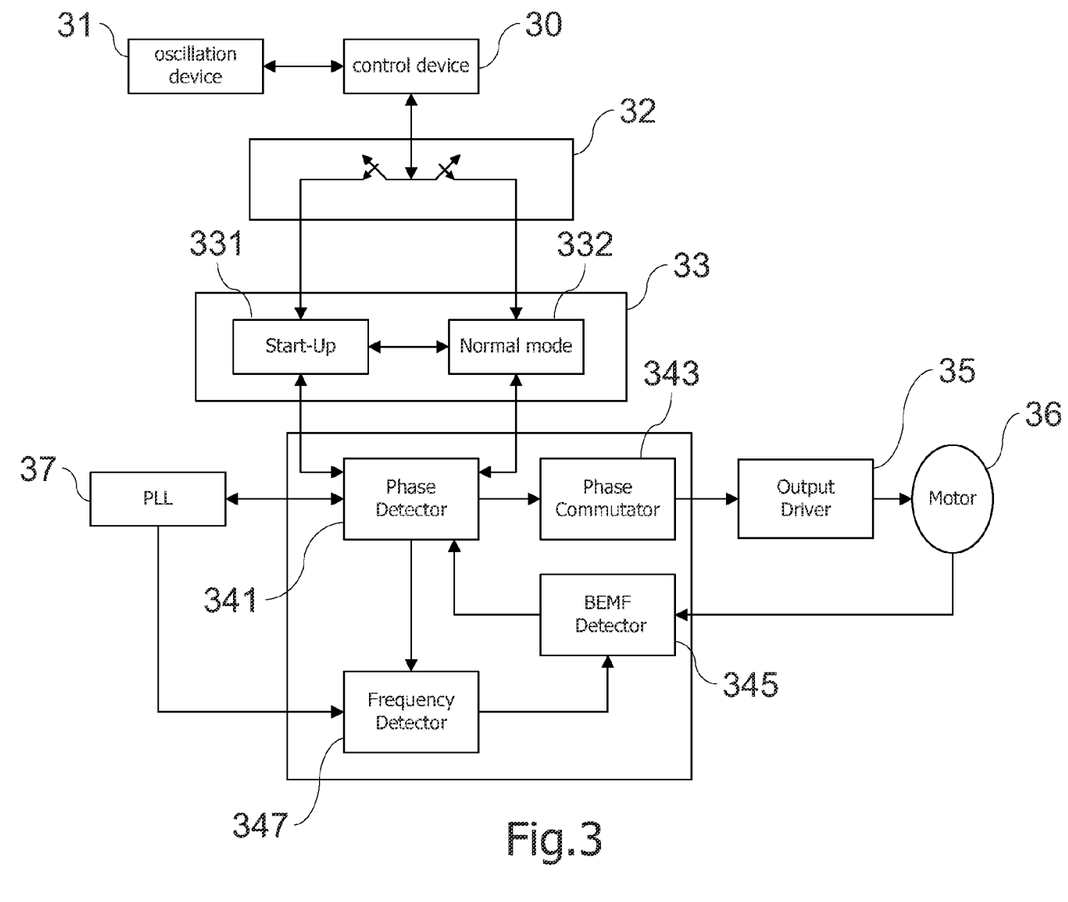
FIG. 3 is a structure view illustrating a motor driving circuit in the present invention.

First of all, please referring to FIG. 3, it is a block diagram illustrating a DC brushless motor system without sensor device. As shown in FIG. 3, the DC brushless motor system includes a control device 30 and the input end thereof is connected to the oscillation device 31. The input end of the switch device 32 is connected to the control device 30 and the output end thereof is connected to the startup device 33. The startup device 33 includes a startup circuit 331 and the normal rotation circuit 333. The detective device 34 includes a phase detective circuit 341, a phase rotation circuit 343, a Back Electromotive Force (BEMF) detector 345 and a frequency detector 347. The input end of the driving circuit 35 is connected to the phase rotation circuit 343 of the detective circuit 34 and the output end thereof is connected to the external motor 36. The phase detective circuit 341 of the detective device 34 is connected to the startup device 33, the phase lock frequency device 37 and the phase rotation circuit 343. The BEMF detective circuit 345 is connected to the external motor 36, the phase lock frequency device 37 and the phase rotation circuit 343. The BEMF detective circuit 345 is connected to the external motor 36, the phase detective circuit 341 and the frequency detective circuit 347. The frequency detective circuit 347 is connected to the phase lock frequency device 37.

When the DC brushless motor system is activated, the control device will control the oscillation device 31 to output an oscillation signal. The startup circuit 331 will activate the rotation speed in accordance with the oscillation signal generated from the oscillation device 31 and the rotation speed will input to the phase detective circuit 341. The phase detective circuit 341 will output the corresponding three-phase driving voltage in accordance with the rotation speed and the rotation speed is transformed into the corresponding six steps driving voltage to the motor driving circuit 35 so as to drive the external motor 36. When the external motor 36 is activated, the BEMF is generated by the current difference in the motor coil and inputted to the BEMF detector 345. The BEMF detector 345 will detect the rotation speed and the phase of the external motor 36 in accordance with the sampled BEMF. At this moment, when the startup rotation speed of the motor is not more than the first predetermined startup rotation speed, the control device 30 will request the oscillation device 31 to transmit the signal continually so as to force the motor rotating. When the rotation speed of the motor is more than the first predetermined startup rotation speed (for example the first determined startup rotation speed is 30 rpm), the control device 30 will activate the switch device 32 to switch the startup device 33 to be the normal rotation circuit 333 and the driving motor will start rotating in accordance with the signal provided by the normal rotation circuit 333.

Similarly, after the control device 30 switch the startup device 33 to the normal rotation circuit 333, the phase detective circuit 341 will detect the normal rotation speed of the motor. Therefore, the phase detective circuit 341 will output the corresponding three-phase driving circuit in accordance with the normal rotation speed of the motor. At the time, the external motor 36 will generate the BEMF in accordance with the current different of the motor coil and input it to the BEMF detector 345. The BEMF detector 345 will detect the rotation speed and the phase of the external motor in accordance with the sampled BEMF. It should be noted that the control device will further detect if the rotation speed of the motor is in the second predetermined startup rotation speed in the preferred embodiment of the present invention (for example the second predetermined startup rotation speed is 180 rpm). When the BEMF detector 345 detects the rotation speed of the motor is not at 180 rpm, it means that the motor has not been activated. Therefore, the control device 30 will drive the switch device 33 to switch the startup device 33 to the startup circuit 331 and request the motor to rotate according to the signal provided by the startup circuit 331. When the phase detective 341 determines that the rotation speed of the motor is in the first predetermined rotation speed, the control device 30 will drive the switch device 32 to switch the startup device 33 to be the normal rotation circuit 302. When the rotation speed of the motor detected by the BEMF detective circuit 341 is more than the second predetermined startup rotation speed (the speed is 180 rpm), it means that the motor is rotated properly in accordance with the signal of the normal rotation circuit 333. At this moment, the control device 30 will determine that the motor has been activated and the startup device 22 is connected to the normal rotation circuit 333. Finally, the BEMF detective circuit 345 will detect the current rotation speed and the phase of the external motor 36 and output the signal to the phase detective circuit 341 to confirm that the driving frequency of the output of the external motor 36 is equal to the output of the phase detective circuit 341.

Figure 4:
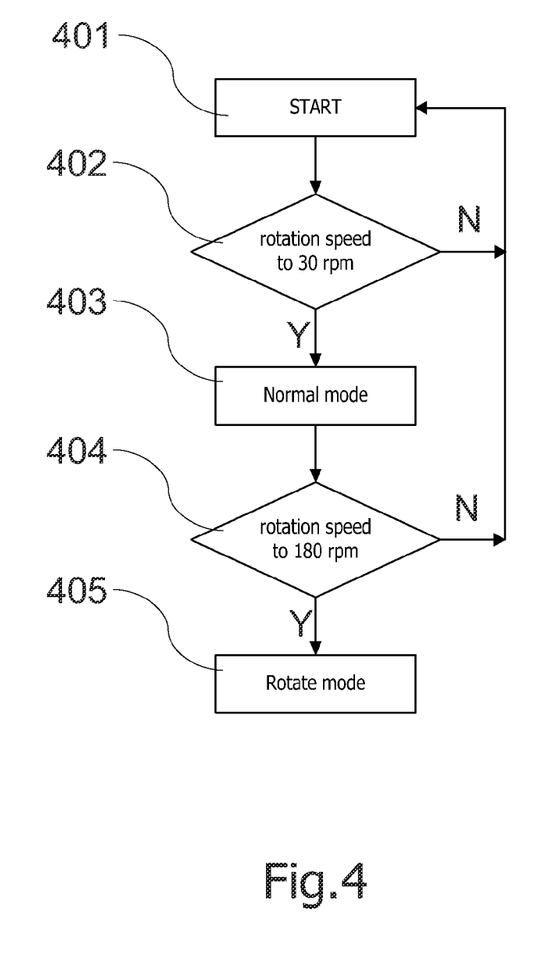
FIG. 4 is a view illustrating a startup mode in the present invention.

Now, please referring to FIG. 4, it is a flow chart illustrating the activated steps of the DC brushless motor system without sensor device. First, at step 401, in the first activated step, the control device 30 of the DC brushless motor system without sensor device will request the oscillation device to output an oscillation signal to the startup circuit 331. The motor 36 will be activated to generate a startup rotation speed. The startup rotation speed of the motor 36 will pass through the BEMF detector 345 to the phase detective circuit 341. A step 402, the control device 30 will continually detect the startup rotation speed of the motor 36. When the startup rotation speed of the motor 36 is in the first predetermined rotation speed, such as the first predetermined rotation speed is 30 rpm, the control device will be in step 403. At step 403, the startup rotation speed of the motor 36 will be in the first predetermined rotation speed, the control device 30 will drive the switch device 32 to switch the startup device 33 to be the normal operative mode and the motor 36 will be rotate properly. Then, at step 404, the control device 30 will continuingly detect the rotation speed of the motor 36. When the rotation speed of the motor 36 will be in the second predetermined rotation speed, such as the second predetermined rotation speed is 180 rpm, the motor 36 has been activated. At step 405, the control device 30 will terminate the startup procedure and the motor 36 is still in the normal operative mode so as to be the predetermined operative rotation speed in the DC brushless motor system without sensor device. On the other hand, when the control device 30 activates the motors 36 and the rotation speed is not in the first predetermined rotation speed, the control device 30 will stay at step 402 and the control device will force the oscillation 31 of the motor system to continually output the oscillation signal to speed up the rotation speed of the motor till the rotation speed is in the first predetermined rotation speed.

The control device 30 will drive the startup device 33 to switch the startup device 33 to be the normal operative mode to the motor keep outputting the rotation speed. When the DC brushless motor system without sensor device is not able to be in the second predetermined rotation speed by the phase detective circuit 341, the motor is not activated properly, as shown in step 404. At this moment, the control device 30 will go back to step 402, the control device 30 will drive the startup device to switch back to the startup circuit 331 to force the motor system to keep outputting the oscillation signal so as to make sure when the motor is in the first predetermined rotation speed and the second activated frequency, the system will go to step 405 and the motion of the system startup is done.

The startup steps in FIG. 4 and the block diagram in FIG. 3 will be further discussed at the following description. First, as shown in step 401, the control device 30 of the motor system will output an oscillation signal so as to drive the switch device 32 to switch the startup circuit 32 to be the startup circuit 331. The startup circuit 331 will transform the oscillation frequency outputted from the oscillation device 31 and output a startup rotation speed to the phase detective circuit 341. The system will go to step 402, the motor system is in the first activation mode and the startup rotation speed of the motor will be continually detected. The phase detective circuit will output the corresponding three-phase driving control signal in accordance with the activated rotation speed outputted by the startup circuit 331 to the phase rotation circuit 343. The phase rotation circuit 343 will convert the three-phase driving control signal to be the six steps driving voltage to the motor driving circuit 35. The motor driving circuit 35 determines the three-phase current in accordance with the six steps driving voltage and the three-phase current will output to the driving coil of the external motor 36 to force the external motor 36 rotating. The phase switching of the three-phase current is determined according to the phase difference of the six steps driving voltage of the motor driving circuit 35. Because the six steps driving voltage is a three-phase switching driving voltage, there is only one phase in Stop State at the same time. At the Stop State, the external motor 36 will stop providing the current on the driving coil. Because of the electromagnetic effect, when the current on the driving coil is stopped, a BEMF will be generated. By utilizing the phase and the frequency of the BEMF, the BEMF is inputted to the BEMF detector 345 to detect the anti-noise ration of the BEMF and the rotation speed and the rotor phase of the external motor 36. However, when the rotation speed of the external motor 36 is not at the first startup rotation speed (such as 30 rpm), the amplifier of the BEMF on the driving coil of the external motor 36 is not large enough and the detective ability of the BEMF detector 345 on the anti-noise of the BEMF is weak. Therefore, The PWM signal outputted from the BEMF detector 345 is easily affected by the noise so as to have an uncertain output value. When the PWM rotation control signal outputted from the BEMF detector 345 is inputted to the phase detective circuit 341, the phase detective circuit 341 will determine the rotation speed of the external motor 36 in accordance with the PWM rotation control signal. When the rotation speed of the external motor 36 is in the first activated rotation speed (ex: 30 rpm), the system will go to step 403. The control device 30 will drive the switch device 32 to switch the startup circuit 331 to the normal rotation circuit 333 and the DC brushless motor is in the normal operative mode. However, the external motor 36 starts to work but it is not in completely start condition. When the rotation speed of the external motor 36 is in the first predetermined startup rotation speed (30 rpm), the system will switch the detective frequency of the detective circuit 341 in the second predetermined startup rotation speed (180 rpm). In the present embodiment, the second predetermined startup rotation speed (180 rpm) is the multiple of the first predetermined startup rotation speed (30 rpm). The motor system will enter the second startup mode from the first startup mode and continually detect the rotation speed of the external motor 36 at step 404. The normal rotation circuit 333 in the startup device 33 will generate the startup rotation speed, which will continually speed up, to the phase detective circuit 341. The phase detective circuit 341 generates three-phase driving control signal in accordance with the startup rotation speed and the three-phase driving control signal is inputted to the phase rotation circuit 343. By converting in the internal circuit of the phase rotation circuit 343, the phase rotation circuit 343 will output a six steps driving voltage to the motor driving circuit 35. The six steps driving voltage will convert to be three-phase current by the motor driving circuit 35 and transmit to the driving coil of the external motor 36. As the description above, the driving current supply on the driving coil of the external motor 36 is corresponding to the six steps driving voltage of the phase rotation circuit 343 and there is only one coil phase stayed in Stop State at the same time. According to the electromagnetic effect, a larger BEMF is generated and transmitted to the BEMF detective circuit 345. Because the BEMF is larger, the ability of the anti-noise is better. The BEMF detective circuit 345 is able to detect the phase of the BEMF properly so as to output the corresponding PWM rotation speed control signal and feed back to the phase detective circuit 341. When the PWM rotation speed control signal is in the second predetermined startup rotation speed (the multiple of 30, such as 180 rpm=30 rpm×6), the startup device 33 will go to step 405 to finish the complete startup steps.

According to the description above, when the DC brushless motor system is in step 402 (the first startup step), the motor system will continually detect the rotation speed of the external motor 36. When the startup rotation speed of the external motor 36 is not in the first predetermined startup rotation speed (30 rpm), the motor system will keep staying in step 402. The BEMF generated by the driving coil of the external motor 36 is directly proportional to the driving voltage on the driving coil of the external motor 36, which is in low rotation speed state. The anti-noise ratio of the BEMF detected by the BEMF detective circuit 345 is weak and the PWM rotation control signal detected by the phase detective circuit 341 is showing that the rotation speed is not going to represent that the motor system is being started normally. Therefore, when the external motor 36 is in the first predetermined startup rotation speed (30 rpm), at step 403, it is going to the normal step. The control device 30 drive the switch device 32 to switch to the normal rotation circuit 333 in the second startup mode from the first startup mode. The BEMF generated by the driving coil of the external motor 306 is large enough to detect the rotation speed and the phase of the external motor 36 for the BEMF detector 345. The motor system will go to step 404 and continually detect the startup rotation speed of the external motor 36. If the PWM rotation control signal detected by the phase detective circuit 341 is not larger than the first predetermined startup rotation speed or the control signal is not in the second predetermined startup rotation speed during a predetermined period, the control device 30 will determine that the startup of the external motor is failure and the motor system will go back to step 402 and the previous step will be repeated till the phase detective circuit 341 detects the rotation speed of the motor is in the first predetermined startup rotation speed (30 rpm) and the second rotation speed (180 rpm). On the other hand, if the phase detective circuit 341 detects the PWM rotation speed control signal is in the second predetermined rotation speed (180 rpm), the motor system finishes the startup procedure. The control device 30 will keep working to speed up the rotation speed to the high speed rotation mode.

Figure 5:
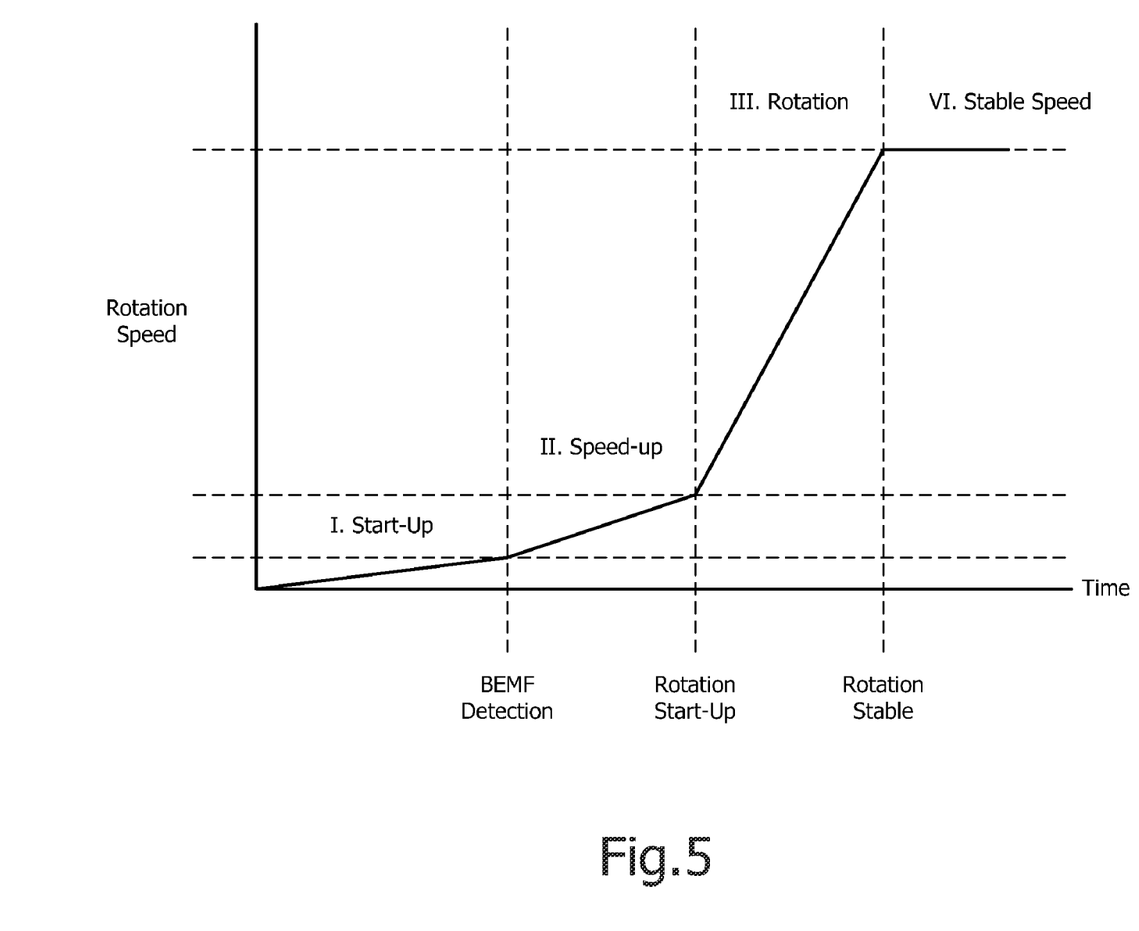
FIG. 5 is a waveform diagram illustrating the startup mode in the present invention.

Now referring to FIG. 5, it is a view to show that the startup mode is switched in the DC brushless motor system. As shown in FIG. 5, the startup mode includes four sections, the first section is the initial section, the second section is the speedup section, the third section is the rotation section and the forth section is the stable rotation section. The first section is the low rotation speed mode, and the control device 30 will drive the motor driving system. The BEMF generated by the external motor 36 is not large enough to determine that the motor system is in normal startup mode. When the motor driving system enters the second section, the BEMF generated by the driving coil of the external motor 36 is large enough to detect the rotation speed and the rotor phase of the external motor 36 so as to confirm the motor system is successfully started. When the rotation speed of the external motor 36 is in the second predetermined startup rotation speed (180 rpm), it means that the motor is completely started in the third section. At this moment, the rotation speed of the external motor 36 keeps going up and the system is in the third section. The external motor 36 is in the predetermined high rotation speed state, the stable state in the forth section.

Figure 6:
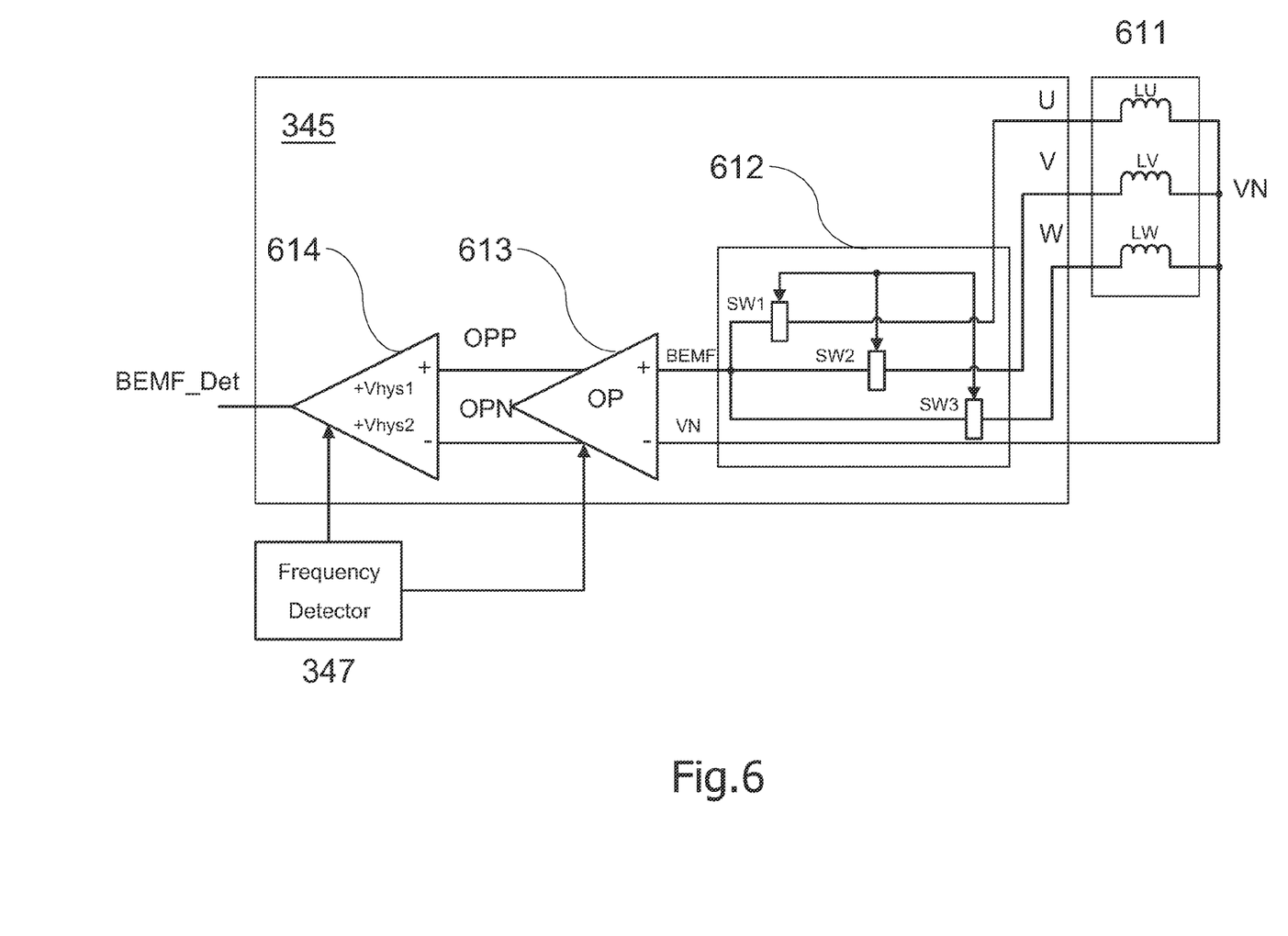
FIG. 6 is a structure view illustrating the BEMF detector in the present invention.

Now referring to FIG. 6, it is a view illustrating the structure of the BEMF detector of the DC brushless motor system. As shown in FIG. 6, the BEMF detector 345 of the DC brushless motor system includes a BEMF detective switch 612, a BEMF amplifier 613, and a hysteresis comparator 614. The BEMF amplifier 613 and the hysteresis comparator 614 are respectively connected to the output of the frequency detector 347. The BEMF detective switch 612 is connected to the three-phase coil 611 at outside of the DC brushless motor system.

As shown in FIG. 6, when the DC brushless motor system is activated, the three-phase current on the external motor 36 is going to the three-phase coil 611, and the three-phase coil 611 will generate the BEMF signal in accordance with the time difference of the three-phase current. In addition, the BEMF detective switch 612 determines the sequence of the internal switching in accordance with the difference of the three-phase current on the three-phase coil 611. Therefore, the BEMF signal generated by the three-phase coil 611 will can pass through the switching control by the BEMF detective switch 612. The BEMF signal passed through the switching control will be transmitted to the BEMF amplifier 613 to compare with a voltage reference $V_N$. The voltage reference $V_N$ is one half of the system voltage (½ Vcc) and is the initial voltage of the three-phase coil 611 and the system voltage is the standard Vcc of the motor driving system. When the BEMF signal is larger than the voltage reference $V_N$, the sine voltage OPP outputted by the BEMF amplifier 613 is the positive level sine voltage. On the other hand, when the BEMF signal is smaller than the voltage reference $V_N$, the sine voltage OPN outputted by the BEMF amplifier 613 is the negative level sine voltage. Therefore, the BEMF amplifier 613 will transmit the signal of the sine voltage OPP and the sine voltage OPN to the input end of the hysteresis comparator 614. The hysteresis comparator 614 will determine the high level and the low level of the signal of the hysteresis comparator 614 in accordance with the sine wave OPP, sine wave OPN and internal hysteresis voltage (±Vhys). For example, when the inputted sine voltage OPP is larger than the internal hysteresis voltage, the BEMF detective signal BEMF_Det outputted by the hysteresis comparator 614 is in high level. When the inputted sine voltage OPP is smaller than the internal hysteresis voltage, the BEMF detective signal BEMF_Det outputted by the hysteresis comparator 614 is in low level.

Subsequently, the BEMF detective signal BEMF_Det is transmitted to the phase detective circuit 341 (as shown in FIG. 3), and the phase detective circuit 341 determines the rotation speed and the phase of the external motor 36 in accordance with the duration of the voltage level of the BEMF detective signal (BEMF_Det). When the motor 36 is in the startup duration, because the rotational speed is not fast (60 rpm), the BEMF signal generated on the three-phase coil 611 is not large. The BEMF signal detected by the BEMF detector 345 is not large enough to resist the noise generated by the system. Therefore, the rotation speed and the phase of the external motor 36 detected in accordance with the BEMF signal (BEMF_Det) by the phase detective circuit 341 is distortion. The motor 36 is activated when the phase detective circuit 341 detects the rotation speed of the external motor 36 in the first predetermined rotation speed and the second predetermined rotation speed in accordance with the BEMF signal (BEMF_Det), the rotation speed is fast enough (1000 rpm) and the BEMF signal detected by the three-phase coil 611 is large enough to resist the system noise. At this moment, the BEMF amplifier 613 of the BEMF detector 345 will determine the voltage gain and the hysteresis comparator 614 will also determine the internal hysteresis level in accordance with the gain control signal outputted by the frequency detector 347. The gain control signal outputted by the frequency detector 347 is generated by comparing the rotation speed of the external motor 36 and the predetermined frequency outputted by the phase lock loop circuit 37.

Subsequently, when the rotation speed of the external motor 36 is not the same as the outputted frequency of the phase lock loop circuit 37 (ex: 2000 rotations or 3000 rotations), the gain control signal outputted by the frequency detector 347 is low voltage. The BEMF amplifier 613 of the BEMF detective circuit 345 will switch to the normal voltage gain mode (the first voltage gain mode). The BEMF amplifier 613 will sequentially output the sine wave voltage OPP and OPN of the BEMF signal to the hysteresis comparator 614 (please referring to FIG. 7A, and the detail description is in the following chapter). On the other hand, when the gain control signal outputted by the frequency detector 347 is low voltage, the sine wave voltages OPP and OPN of the BEMF signal outputted by the BEMF amplifier 613 is the normal voltage gain mode (the first voltage gain mode). The hysteresis level of the hysteresis comparator 614 is in the first hysteresis level (+Vhys) to resist the initial noise of the system. Now, the BEMF amplifier 613 will compare the BEMF signal detected by the three-phase coil 611 and the level voltage $V_N$ the signal is adjusted by the voltage of the frequency detector 347. The sine wave voltages OPP and OPN are inputted to the hysteresis comparator 614, the BEMF detective signal (BEMF_Det) outputted by the hysteresis comparator 614 is also inputted to the phase detective circuit 341 to determine the rotation speed and the phase of the external motor 36.

When the rotation speed of the external motor 36 is in the second predetermined rotation speed and the rotation speed of the external motor 36 is increased. For example, the rotation speed of the external motor 36 is in the predetermined frequency (2000 rotations or 3000 rotation), the gain control signal outputted by the frequency detector 347 will switch to be high voltage. The control device 30 in FIG. 3 will utilize two implemented methods to have good anti-noise ration. At first, the first implemented method is to control the BEMF detector 345 by the control frequency detector 347 of the phase detective circuit 341 and drive the BEMF amplifier 613 of the BEMF detector 345 to switch to the voltage suppressing mode (the second voltage gain mode) from the normal voltage gain mode. The sine wave voltages OPP and OPN outputted by the BEMF amplifier 613 will not be continually increased in accordance with the BEMF signal, and the sine wave voltage OPP and OPN is maintained in low speed state. On the other hand, in the present embodiment, when the gain control signal outputted by the frequency detector 347 is changed to be high voltage, the amplitude of the sine wave voltages OPP and OPN outputted by the BEMF amplifier 613 is suppressed as the same as the normal voltage gain mode (the first voltage gain mode). In addition, in the second implemented method, the frequency detector 347 controlled by the phase detective circuit 341 is configured to control the BEMF detector 345 and the internal hysteresis level of the hysteresis comparator 614 of the BEMF detector 345 is switched from the first hysteresis level (+Vhys) to be the second hysteresis level (+Vhys2) to resist the noise of the high rotation speed of the system. Obviously, the voltage level of the second hysteresis level (+Vhys2) is larger than the first hysteresis level (+Vhys).

According to the first implemented method described above, the BEMF amplifier 613 will suppress the voltage of the BEMF signal and compare to the level voltage $V_N$. After the voltage suppressing in the frequency detector 347, the sine wave voltages OPP and OPN outputted by the BEMF amplifier 613 at the first voltage gain mode and the second voltage gain mode include the same amplitude and are inputted to the hysteresis comparator 614. The hysteresis comparator 614 will compare the sine wave voltages OPP and OPN with the first hysteresis level (+Vhys). When the sine wave voltage OPP is larger than the first hysteresis level, the BEMF detective signal (BEMF_Detc) outputted by the hysteresis comparator 614 will be low voltage level. The BEMF detective signal (BEMF_Detc) outputted by the hysteresis comparator 614 will be inputted to the phase detective circuit 341 to determine the rotation speed and the phase of the external motor 36 so as to accurately detect and sample the rotation speed and the phase of the external motor 36.

Figure 7A:
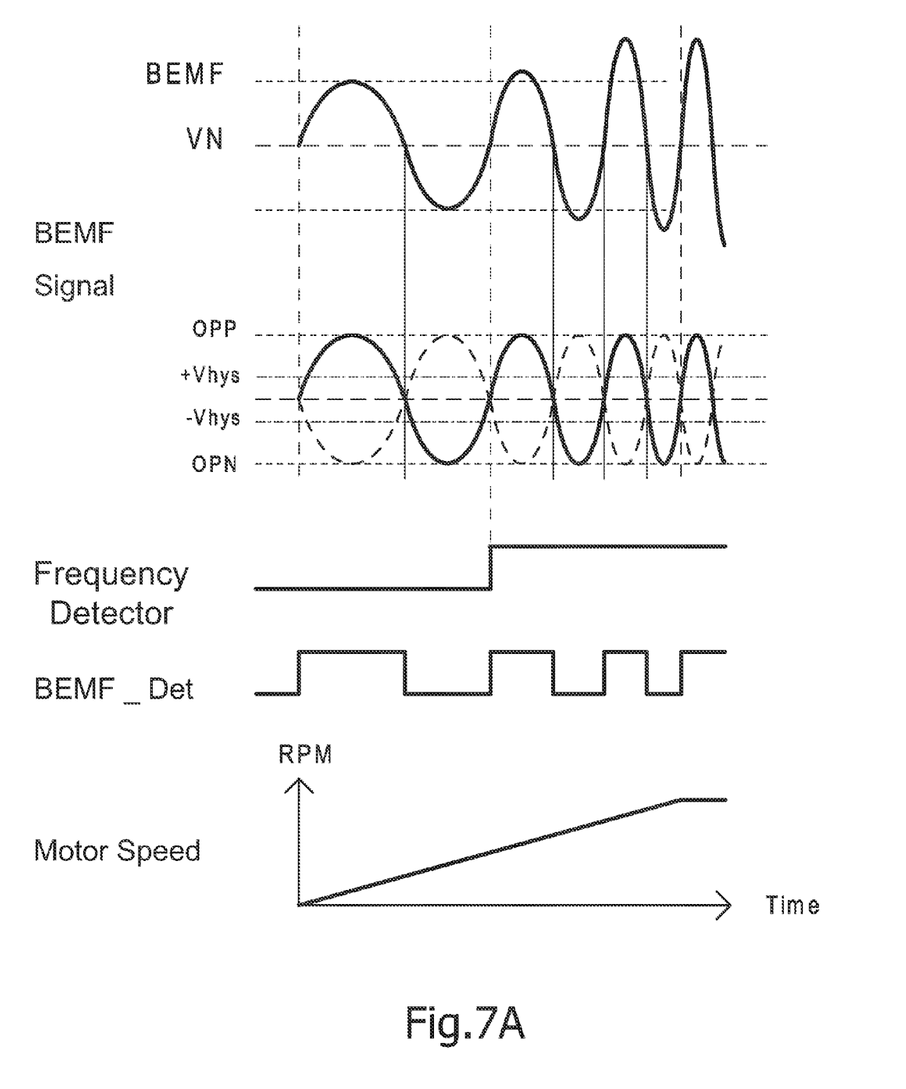
FIG. 7A is a waveform diagram illustrating the BEMF detector sampling level in the present invention.

Subsequently, the signal wave diagram of the operation in the present invention is further described herein. Please referring to FIG. 7A and FIG. 7B, it is a signal wave diagram illustrating the rotation speed of the DC brushless motor and the BEMF detector in the present invention. As shown in FIG. 7A, the BEMF signal generated by the current sequential difference on the three-phase coil 611 of the external motor 36 is inputted to the BEMF detector 345 and the BEMF signal waveform is a sine wave voltage waveform. The BEMF amplifier 613 within the BEMF detector 345 will generate the normal voltage gain mode and the voltage suppressing mode in accordance the control signal of the frequency detector 347. When the motor is in the first startup mode (the gain control signal outputted by the frequency detector 347 is the low voltage), the BEMF amplifier will compare the level voltage $V_N$ and the BEMF signal. As shown in FIG. 7A, when it is in the first voltage gain mode, the BEMF signal is larger than the level voltage $V_N$, the sine wave voltage OPP outputted by the BEMF amplifier 613 is in the positive voltage sine wave, and the sine wave OPN is in the negative sine wave. The second level is in the startup mode, but it is not achieved to the predetermined frequency outputted by the phase lock loop circuit (2000 rotation or 3000 rotation). The gain control signal outputted by the frequency detector 347 is in the low voltage state. And the BEMF amplifier 613 will keep comparing the level voltage $V_N$ and the BEMF signal and output the sine wave voltage OPP and OPN. The sine wave voltage OPP and OPN will be inputted to the hysteresis comparator 614. Now, the hysteresis comparator 614 will compare the sine wave voltage OPP and OPN with the first hysteresis lever (+Vhys). When the sine wave voltage OPP is larger than the first hysteresis level (+Vhys), the BEMF detective signal (BEMF_Detc) of the hysteresis comparator 614 is in high voltage level. When the sine wave voltage OPP is less than the first hysteresis level, the BEMF detective signal of the hysteresis comparator 614 is in the low voltage level. Obviously, the first hysteresis lever (+Vhys) is configured to resist the low noise when the motor driving system is in the low rotation speed. When the rotation speed of the external motor 36 is in the predetermined frequency (2000 rotation or 3000 rotation), the motor is in high rotation speed. The gain control signal outputted by the frequency detector 347 is changed to be high voltage and the noise of the gain control signal is also become large. The BEMF amplifier 613 will do the voltage suppressing action (the second voltage gain mode) in accordance with the control signal of the frequency detector 347. According to FIG. 7, at the second voltage gain mode, the larger BEMF signal will be suppressed and the suppressed BEMF signal is closed the BEMF signal in low rotation speed (the first voltage gain mode). The system noise of the motor driving system will also be suppressed and the suppressed BEMF signal will be inputted to the hysteresis comparator 614 and compared with the first hysteresis level (+Vhys). Obviously, the period of the sine wave voltage OPP and OPN in the second voltage gain mode is faster than in the first voltage gain mode. When the sine wave voltage OPP is lower than the first hysteresis level, the BEMF detective signal outputted by the hysteresis comparator 614 will be in the low level. The BEMF detective signal (BEMF_Dect) can avoid the distortion caused by the noise so as to achieve the goal of suppressing the noise.

Figure 7B:
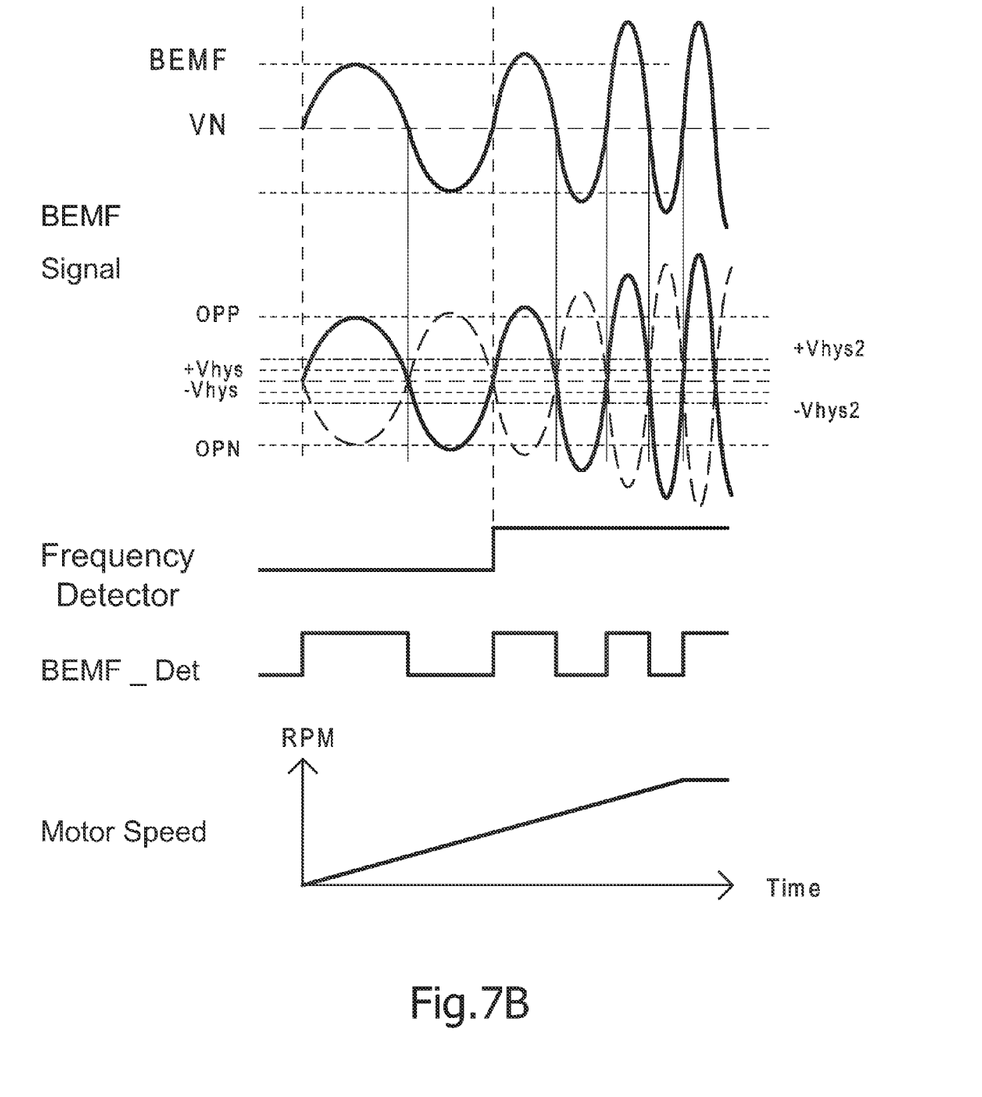
FIG. 7B is a waveform diagram illustrating the BEMF detector sampling level in another embodiment.

Now, as shown in FIG. 7B, it is a wave diagram illustrating the BEMF amplifier and the hysteresis comparator in another embodiment. As shown in FIG. 7B, when the motor is in the first startup mode (the gain control signal outputted by the frequency detector 347 is low voltage), the BEMF amplifier 613 will compare the level voltage $V_N$ with the BEMF signal. In FIG. 7B, at the first voltage gain mode, the BEMF signal is larger than the level voltage VN, the sine wave voltage OPP of the BEMF amplifier is in positive voltage sine wave and the sine wave voltage OPN is in negative voltage sine wave. When the second mode is in the startup mode but it is not in the predetermine frequency (2000 rotation or 3000 rotation), the gain control signal of the frequency detector 347 will maintain in the low voltage state. The BEMF amplifier 613 will compare the level voltage $V_N$ with the BEMF signal and output the sine wave voltage OPP and OPN. The sine wave OPP and OPN will input to the hysteresis comparator 614, and the hysteresis comparator 614 will compare the sine wave voltage OPP and OPN with the first hysteresis level (+Vhys). When the sine wave voltage OPP is larger than the first hysteresis level, the BEMF detective signal (BEMF_Detc) outputted by the hysteresis comparator 614 is in the high voltage level. When the sine wave voltage OPP is less than the first hysteresis level, the BEMF detective signal (BEMF_Detc) outputted by the hysteresis comparator 614 is in the low voltage level. The first hysteresis level is configured to resist the low noise when the motor driving system is in low rotation speed. When the external motor 36 is in high rotation speed (ex: 2000 rotation or 3000 rotation), the BEMF signal is increased and the noise is also increased. The system noise generated by the motor driving system is also enhanced. The hysteresis level of the hysteresis comparator 614 of the BEMF detector 345 is switched to the second hysteresis level (+Vhys2) from the first hysteresis level (+Vhys). The BEMF amplifier 613 will output the sine wave voltage OPP and OPN to the hysteresis comparator 614. The hysteresis comparator 614 will compare the sine wave voltage OPP and OPN with the second hysteresis level (+Vhys) and output the BEMF detective signal (BEMF_Detec). When the sine wave voltage OPP is larger than the second hysteresis level, the BEMF detective signal (BEMF_Detc) outputted by the hysteresis comparator 614 is in the high voltage level. When the sine wave voltage OPP is less than the second hysteresis level, the BEMF detective signal (BEMF_Detc) outputted by the hysteresis comparator 614 is in the low voltage level. Therefore, the signal distortion caused by the noise is able to be avoided.

What is claimed is:

1. A direct current (DC) brushless motor system without sensor device having two steps startup function including a control device and one end of the control device is connected to an oscillation device, a switching device and one end of the switching device is connected to the control device and the other end is connected to a startup device, a detective device and one end of the detective device is connected to the startup device, a driving circuit and one end of the driving circuit is connected to the detective device and the other end is connected to an external motor and feedbacks to the other end of the detective circuit; wherein the DC brushless motor system is characterized by:

when the DC brushless motor system has been activated, the rotation speed of the DC brushless motor system is sequentially achieved in a first predetermined startup rotation speed and a second predetermined startup rotation speed with different frequency so as to achieve a system predetermined rotation; and wherein the detective device is made by a phase detective circuit, a phase rotation circuit, a Back Electromotive Force (BEMF) detector and a frequency detector, and one end of the phase detective circuit is connected to the startup device and the other end is connected to the phase rotation device, and the other end of the phase rotation circuit is connected to one end of the driving circuit, and one end of the BEMF detector is connected to the feedback of the driving circuit and the external motor and the other end is connected to the phase detective circuit and the frequency detector, and the frequency detector is connected to the phase detective circuit.

2. The DC brushless motor system of claim 1, wherein the startup device is made by a startup circuit and a normal rotation circuit.

3. The DC brushless motor system of claim 1, wherein the second predetermined startup rotation speed is integral multiple of the first predetermined rotation speed.

4. The DC brushless motor system of claim 1, wherein the first predetermined rotation speed is 30 rpm.

5. A direct current (DC) brushless motor system without sensor device comprising:

a control device, and one end of the control device is connected to an oscillation device;

a switching device, and one end of the switching device is connected to the other end of the control device;

a startup device, and one end of the startup device is connected to the other end of the switching device;

a detective device, and one end of the detective device is connected to the other end of the startup device;

a driving circuit and one end of the driving circuit is connected to the other end of the detective device and the other end is connected to an external motor; and feedbacks to the other end of the detective circuit from a three-phase coil of the external motor;

a phase lock loop frequency device connected to the detective device, wherein the detective device includes:

a phase detective circuit, and one end of the phase detective device is connected to the startup device and the other end is connected to the frequency detector and the phase lock loop frequency device;

a phase rotation circuit, and one end of the phase rotation circuit is connected to the other end of the phase detective circuit and the other end is connected to one end of the driving circuit;

a BEMF detector, and one end of the BEMF detector is connected to the feedback of the three-phase coil of the external motor and the other end is connected to the phase detective circuit;

a frequency detector, and one end of the frequency detector is connected to the phase detective circuit and the phase lock loop frequency device and the other end is connected to the BEMF detector; wherein the BEMF detector includes:

a BEMF detective switch, and one of the BEMF detective switch is connected to the feedback of the three-phase coil of the external motor;

a BEMF sample amplifier, wherein a first input end is connected to an output end of the BEMF switch, a second input end is connected to a level voltage of the three-phase coil, and a third input end is connected to the frequency detector and outputs a positive voltage sine wave and a negative voltage sine wave;

a hysteresis comparator including a first hysteresis level, and an input end is connected to the positive voltage sine wave and the negative voltage sine wave and the other end is connected to the frequency detector and outputs a BEMF detective signal to the phase detective circuit.

6. The DC brushless motor system of claim 5, wherein the BEMF amplifier includes a normal voltage gain mode and a voltage suppressing mode.

7. The DC brushless motor system of claim 5, wherein the hysteresis comparator further includes a second hysteresis level.

8. The DC brushless motor system of claim 5, wherein the startup device is made by a startup circuit and a normal rotation circuit.

9. The DC brushless motor system of claim 5, when the DC brushless motor system has been activated, the rotation speed of the DC brushless motor system is sequentially achieved in a first predetermined startup rotation speed and a second predetermined startup rotation speed with different frequency so as to achieve a system predetermined rotation.

10. The DC brushless motor system of claim 9, wherein the second predetermined startup rotation speed is integral multiple of the first predetermined rotation speed.

11. A rotation speed and phase detective method for a direct current (DC) brushless motor system without sensor device, and the DC brushless motor system includes a control device and one end of the control device is connected to an oscillation device, a switching device and one end of the switching device is connected to the control device and the other end is connected to a startup device, a detective device and one end of the detective device is connected to the startup device, a driving circuit and one end of the driving circuit is connected to the detective device and the other end is connected to an external motor and feedbacks to the other end of the detective circuit from a three-phase coil of the external motor; a phase lock loop frequency device connected to the detective device and wherein the detective device includes a phase detective circuit, and one end of the phase detective device is connected to the startup device and the other end is connected to the frequency detector and the phase lock loop frequency device; a phase rotation circuit, and one end of the phase rotation circuit is connected to the other end of the phase detective circuit and the other end is connected to one end of the driving circuit; a BEMF detector, and one end of the BEMF detector is connected to the feedback of the three-phase coil of the external motor and the other end is connected to the phase detective circuit; a frequency detector, and one end of the frequency detector is connected to the phase detective circuit and the phase lock loop frequency device and the other end is connected to the BEMF detector; wherein the BEMF detector includes: a BEMF detective switch, and one of the BEMF detective switch is connected to the feedback of the three-phase coil of the external motor; a BEMF sample amplifier, wherein a first input end is connected to an output end of the BEMF switch, a second input end is connected to a level voltage of the three-phase coil, and a third input end is connected to the frequency detector and outputs a positive voltage sine wave and a negative voltage sine wave; a hysteresis comparator including a first hysteresis level, and an input end is connected to the positive voltage sine wave and the negative voltage sine wave and the other end is connected to the frequency detector and outputs a BEMF detective signal to the phase detective circuit, wherein when the DC brushless motor system has been activated, the rotation speed and the phase detective method comprising:

providing a BEMF generated by three-phase current sequence on the three-phase coil passing the BEMF detective switch;

providing a level voltage provided by the three-phase coil; provide a pair of sine wave voltages generated in accordance with comparing the BEMF and the level voltage by the BEMF amplifier, and the pair of sine wave voltages includes a positive voltage sine wave and a negative voltage sine wave;

providing a BEMF detective signal generated in accordance with the sine wave voltages by the hysteresis comparator, and the BEMF detective signal is connected to the phase detective circuit to detect the present rotation speed and the phase of the external motor; and providing a gain control signal, and the gain control signal is outputted in accordance with the preset rotation speed of the phase lock loop frequency device and the present rotation speed of the external motor by the frequency detector.

12. The detective method of claim 11, wherein the hysteresis comparator further includes a second hysteresis level.

13. The detective method of claim 12, wherein the gain control signal is a high voltage signal when the rotation speed of the external motor is larger than the preset rotation speed of the phase lock loop frequency device, and the hysteresis level in the hysteresis comparator is switched to the second hysteresis level.

14. The detective method of claim 11, wherein the gain control signal is a low voltage signal when the rotation speed of the external motor is less than the preset rotation speed of the phase lock loop frequency device, and the BEMF amplifier is switched to the normal voltage gain mode.

15. The detective method of claim 14, where the hysteresis level in the hysteresis comparator is a first hysteresis level.

16. The detective method of claim 11, wherein the gain control signal is a high voltage signal when the rotation speed of the external motor is larger than the preset rotation speed of the phase lock loop frequency device, and the BEMF amplifier is switched to the voltage suppressing mode.

17. The detective method of claim 16, where the hysteresis level in the hysteresis comparator is a first hysteresis level.

18. The detective method of claim 11, when the DC brushless motor system has been activated, the rotation speed of the DC brushless motor system is sequentially achieved in a first predetermined startup rotation speed and a second predetermined startup rotation speed with different frequency.

19. The detective method of claim 18, wherein the second predetermined startup rotation speed is integral multiple of the first predetermined rotation speed.

\* \* \* \* \*